US010731787B2

(12) United States Patent
Gordon et al.

(10) Patent No.: US 10,731,787 B2
(45) Date of Patent: Aug. 4, 2020

(54) INSULATING INSERTS FOR FIELD JOINTS OF COATED RIGID PIPELINES

(71) Applicant: Subsea 7 Limited, Sutton (GB)

(72) Inventors: Mike Gordon, Godalming (GB); Sylvain Popineau, London (GB); Philippe Benoit Jacques Hoffman, Paris (FR)

(73) Assignee: Subsea 7 Limited, Sutton (GB)

( * ) Notice: Subject to any disclaimer, the term of this patent is extended or adjusted under 35 U.S.C. 154(b) by 65 days.

(21) Appl. No.: 15/538,167

(22) PCT Filed: Dec. 22, 2015

(86) PCT No.: PCT/GB2015/054120
§ 371 (c)(1),
(2) Date: Jun. 20, 2017

(87) PCT Pub. No.: WO2016/102953
PCT Pub. Date: Jun. 30, 2016

(65) Prior Publication Data
US 2018/0274712 A1 Sep. 27, 2018

(30) Foreign Application Priority Data
Dec. 24, 2014 (GB) .................................. 1423231.8

(51) Int. Cl.
F16L 59/20 (2006.01)
F16L 59/02 (2006.01)
(Continued)

(52) U.S. Cl.
CPC .............. F16L 59/20 (2013.01); B21D 39/00 (2013.01); B29C 45/00 (2013.01);
(Continued)

(58) Field of Classification Search
CPC . F16L 59/20; F16L 3/1066; F16L 9/04; F16L 59/024; B29C 45/14819
See application file for complete search history.

(56) References Cited

U.S. PATENT DOCUMENTS 4,660,861 A 4/1987 Argy et al.
7,568,861 B2 8/2009 Godoy et al.
(Continued)

FOREIGN PATENT DOCUMENTS

CH 372518 10/1963
DE 710 108 9/1941
(Continued)

OTHER PUBLICATIONS

API Specification 5L, "Specification for Line Pipe," American Petroleum Institute, Dec. 2012.
(Continued)

Primary Examiner — Anna M Momper
Assistant Examiner — Fannie C Kee
(74) Attorney, Agent, or Firm — Levy & Grandinetti

(57) ABSTRACT

An insulating insert is positioned around a field joint of a pipeline to insulate the field joint. The insert includes a longitudinal series of annular or part-annular filler segments of insulating material, curved about a longitudinal axis, that are each joined to one or more adjacent segments of the series by at least one link. The links may be webs, rods or articulated links. The links are flexible relative to the segments to facilitate bending of the insert along its length by enabling relative angular displacement between adjacent segments of the series.

11 Claims, 11 Drawing Sheets

(51) Int. Cl.

| | | |
|---|---|---|
| *F16L 9/04* | (2006.01) | |
| *F16L 3/10* | (2006.01) | |
| *B29C 45/00* | (2006.01) | |
| *F16L 13/00* | (2006.01) | |
| *B21D 39/00* | (2006.01) | |
| *F16L 9/147* | (2006.01) | |
| *B29C 65/14* | (2006.01) | |
| *B29C 65/50* | (2006.01) | |
| *B29C 45/14* | (2006.01) | |
| *F16L 9/12* | (2006.01) | |
| *B29K 75/00* | (2006.01) | |
| *B29L 23/00* | (2006.01) | |
| *F16L 1/00* | (2006.01) | |
| *B29C 65/48* | (2006.01) | |
| *B29C 65/54* | (2006.01) | |

(52) U.S. Cl.
CPC .. *B29C 45/14614* (2013.01); *B29C 45/14639* (2013.01); *B29C 45/14819* (2013.01); *B29C 65/1412* (2013.01); *B29C 65/1432* (2013.01); *B29C 65/5042* (2013.01); *F16L 3/1066* (2013.01); *F16L 3/1075* (2013.01); *F16L 9/04* (2013.01); *F16L 9/147* (2013.01); *F16L 13/00* (2013.01); *F16L 59/021* (2013.01); *F16L 59/024* (2013.01); *F16L 59/029* (2013.01); *B29C 65/4815* (2013.01); *B29C 65/542* (2013.01); *B29K 2075/00* (2013.01); *B29L 2023/225* (2013.01); *F16L 1/00* (2013.01); *F16L 9/121* (2013.01); *Y10T 29/4998* (2015.01); *Y10T 29/49982* (2015.01)

(56) References Cited

U.S. PATENT DOCUMENTS

| | | |
|---|---|---|
| 2010/0186881 A1 | 7/2010 | Bregonzio |
| 2014/0154409 A1 | 6/2014 | Bregonzio |

FOREIGN PATENT DOCUMENTS

| | | |
|---|---|---|
| DE | 102007018519 | 10/2008 |
| EP | 0 145 371 | 6/1985 |
| EP | 0 220 122 | 4/1987 |
| EP | 1 310 718 | 5/2003 |
| GB | 1 473 856 | 5/1977 |
| GB | 2 165 910 | 4/1986 |
| WO | WO 96/05464 | 2/1996 |
| WO | WO 03/095887 | 11/2003 |
| WO | WO 2010/049667 | 5/2010 |
| WO | WO 2012/004665 | 1/2012 |
| WO | WO 2012/072894 | 6/2012 |
| WO | WO 2013/070074 | 5/2013 |
| WO | WO 2013/154432 | 10/2013 |
| WO | WO 2013/155172 | 10/2013 |

OTHER PUBLICATIONS

API Recommended Practice 17B, "Recommended Practice for Flexible Pipe," American Petroleum Institute, May 2014.
API Specification 17J, "Specification for Unbonded Flexible Pipe," American Petroleum Institute, May 2014.
API Recommended Practice 1111, "Design, Construction, Operation, and Maintenance of Offshore Hydrocarbon Pipelines," American Petroleum Institute, Sep. 2015.

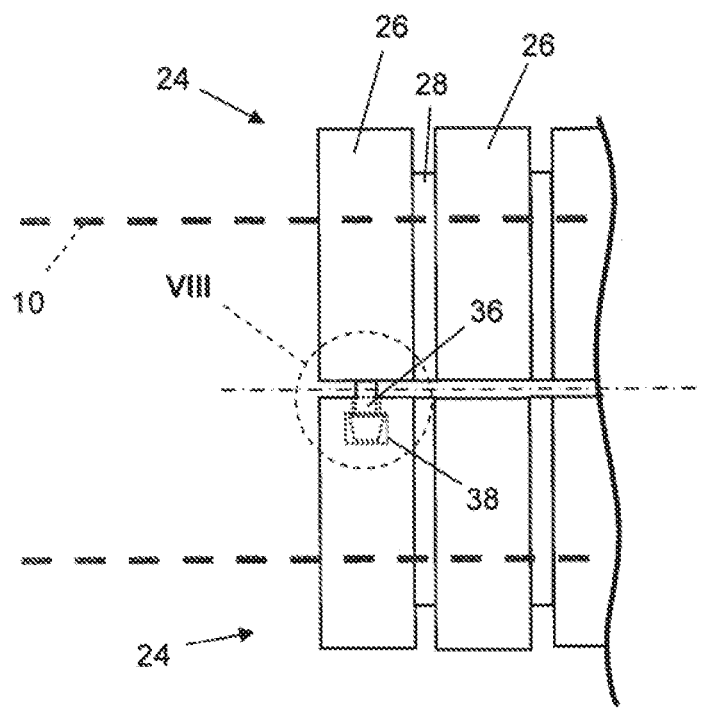
Figure 7
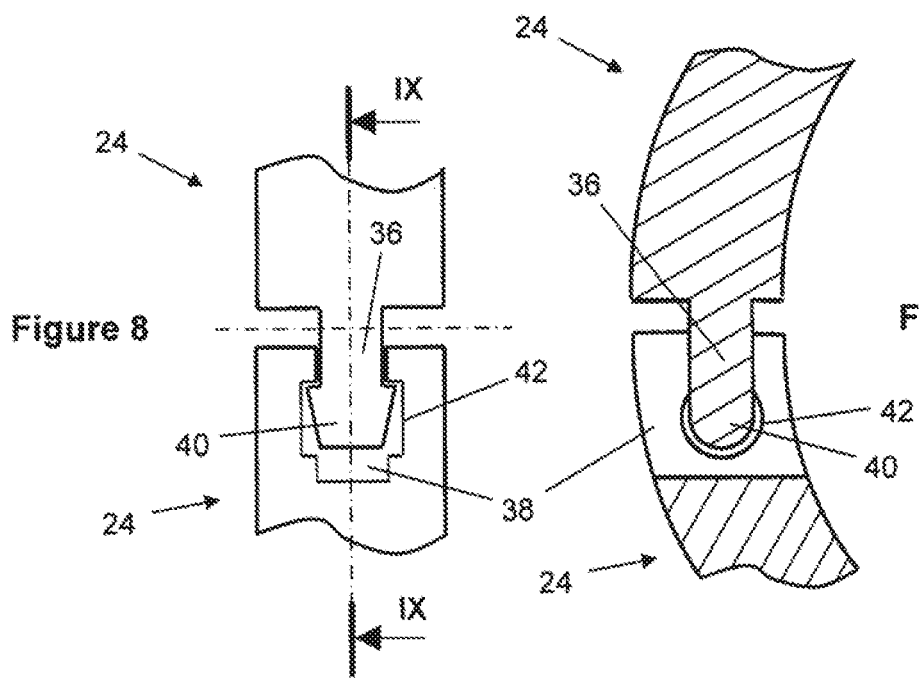
Figure 8
Figure 9

INSULATING INSERTS FOR FIELD JOINTS OF COATED RIGID PIPELINES

This invention relates to coated pipelines and in particular to insulating inserts or infills for field joints of coated rigid pipelines, as used in the subsea oil and gas industry.

Rigid subsea pipelines are commonly formed of lengths of steel pipe—'pipe joints'—that are welded together end-to-end. Pipe joints are typically about 12 m in length but may be manufactured in multiples of that length, such as double, triple or quad pipe joints. To mitigate corrosion of the pipeline and to insulate the fluids that the pipeline carries in use, pipe joints are pre-coated, when manufactured, with protective and thermally-insulating parent coatings.

It is important to understand that in the subsea oil and gas industry, the terms 'rigid' and 'flexible' as applied to pipes have clear meanings that differ in important respects from general language. For example, nominally 'rigid' pipes have enough flexibility to be bent if a minimum bend radius is observed. Yet, such pipes are not regarded in the industry as being 'flexible'.

Flexible pipes used in the subsea oil and gas industry are specified in API (American Petroleum Institute) Specification 17J and API Recommended Practice 17B. The pipe body is composed of a composite structure of layered materials, in which each layer has its own function. Typically, polymer tubes and wraps ensure fluid-tightness and thermal insulation. Conversely, steel layers or elements provide mechanical strength; for example, interlocked steel tapes form a carcass or pressure vault and a tensile armour is formed of helically-wound wire. Flexible pipes are terminated and assembled by end fittings. Unlike rigid pipelines that are fabricated by welding together multiple pipe joints, flexible pipelines are typically manufactured continuously to the desired length between their end fittings.

The structure of a flexible pipe allows a large bending deflection without a similarly large increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the minimum bending radius or MBR of flexible pipe used in the subsea oil and gas industry is typically between 3 and 6 metres.

Conversely, rigid pipes used in the subsea oil and gas industry are specified in API Specification 5L and Recommended Practice 1111. In contrast to flexible pipes, a rigid pipe usually consists of or comprises at least one pipe of solid steel or steel alloy. However, additional elements can be added, such as an internal liner layer or an outer coating layer. Such additional elements can comprise polymer, metal or composite materials. Rigid pipe joints are typically terminated by a bevel or a thread, and are assembled end-to-end by welding or screwing them together.

The allowable in-service deflection of rigid steel pipe is determined by the elastic limit of steel, which is around 1% bending strain. Exceeding this limit caused plastic deformation of the steel. It follows that the MBR of rigid pipe used in the subsea oil and gas industry is typically around 100 to 300 metres depending upon the cross-sectional dimensions of the pipe. However, slight plastic deformation can be recovered or rectified by mechanical means, such as straightening. Thus, during reel-lay installation of a rigid pipeline made up of welded rigid pipes, the rigid pipeline can be spooled on a reel with a typical radius of between 8 and 10 metres. This implies a bending strain above 2% for conventional diameters of rigid pipes, requiring the pipeline to be straightened mechanically upon unspooling.

Thermal insulation is an important requirement for many subsea pipelines, especially those used to transport crude oil from subsea wellheads. As collected at the outlet of a wellhead, crude oil is a viscous, multiphasic, pressurised fluid at an elevated temperature, typically around 200° C. If the crude oil is allowed to cool to a significantly lower temperature, typically below 30° C., some components of the crude oil may solidify by mechanisms such as coalescence, precipitation or gelling. The waxes, asphaltenes, hydrates or other solid condensates that appear as a result may clog the pipeline and are difficult to remove.

Polypropylene (PP) is most commonly used as the parent coating of pipe joints from which pipelines are fabricated. For example, a three-layer PP (3LPP) coating comprises a first layer of epoxy primer, a second thin layer of PP bonded with the primer and a third, thicker layer of extruded PP applied over the second layer. A five-layer PP (SLPP) coating adds two further layers, namely a fourth layer of PP modified for thermal insulation, such as glass syntactic PP (GSPP) or a foam, surrounded by a fifth layer of extruded PP for mechanical protection of the insulating fourth layer. Similar additional layers are possible for further thermal insulation, as in a seven-layer PP (7LPP) coating.

A short length of pipe is left uncoated at each end of a pipe joint to facilitate welding to abutting pipe joints. After welding, the resulting field joint comprises two bare steel pipe ends of the abutting pipe joints and the butt weld that joins those pipe joints together. Consequently, the field joint defines a gap in the parent coating that was applied to the pipe joints when they were manufactured.

Once the weld between abutting pipe joints passes testing, the field joint must be coated with a field joint coating to mitigate corrosion and to maintain the necessary degree of insulation. Thus, the field joint coating fills the gap in the parent coating. In this respect, it is important that pipelines are covered by continuous thermal insulation extending across the field joints between the successive pipe joints. Otherwise, cold spots may arise that could promote clogging of the pipeline by solid condensates.

A design constraint particularly of reel-lay pipelines is that the outer diameter of the field joint coating cannot be significantly different to the outer diameter of the parent coatings on the adjacent pipe joints.

Field joint coatings may be applied by casting or injection-molding techniques using thermoset materials such as polyurethane (PU) that cure and harden by cross-linking or thermoplastic materials such as PP that cure and harden by cooling.

In a cast-molded PU (CMPU) process, an example of which is disclosed in DE 102007018519, the exposed pipe surface at the abutting welded ends of the pipe joints is cleaned and a primer is applied. A mold is then positioned to enclose the field joint and a two-component urethane material is cast into the annular cavity defined within the mold around the field joint. The urethane then cures, cross-linking and solidifying to form PU in an irreversible chemical reaction. When the PU has cured sufficiently, the mold is removed to leave the field joint coating in place around the field joint.

Another approach is to use PP as the field joint coating in an injection molded polypropylene (IMPP) process. An example of an IMPP process is disclosed in our earlier patent application published as WO 2012/004665.

In an IMPP process, the exposed pipe surface at the abutting welded ends of the pipe joints is cleaned, primed and heated, for example using induction heating or gas flames. Exposed chamfers at the adjacent ends of the parent coatings are also heated.

The field joint is then enclosed by a mold that defines an annular cavity around the field joint. Molten PP is injected into the cavity under high pressure. Once the PP has cooled sufficiently, the mold is removed, leaving a tube of PP around the field joint as the field joint coating. This tube is continuous with the tubular parent coating surrounding the pipe joints, such that the same or compatible coating materials extend all along the length of the pipe string.

A field joint coating of IMPP has broadly similar mechanical and thermal properties to a parent coating of PP. Also, the parent coating and the field joint coating are sufficiently compatible that they fuse together at their mutual interface, resisting cracking and hence giving longer service life. The service temperature of PP is also markedly higher than PU.

In many cases, pipe joints are welded together offshore aboard an installation vessel as the pipeline is laid, typically by S-lay or J-lay methods. It is also common to fabricate pipe stalks from pipe joints onshore at a spoolbase or yard and then to weld together the pipe stalks end-to-end to spool the prefabricated pipeline onto a reel. The spooled pipeline is then transported offshore for laying in a reel-lay operation. When spooling, bending of the pipeline extends beyond elastic limits into plastic deformation that must be recovered by subsequent straightening processes during unspooling when laying.

In the S-lay method, a pipeline is welded from pipe joints along a horizontal firing line. The pipeline is launched from the vessel over a stinger that supports an overbend of the pipeline, from which the pipeline curves down through the water to a sag bend leading to a touchdown point on the seabed. Field joint coating is carried out upstream of the stinger, at one or more coating stations to which the pipeline is advanced in stepwise fashion after welding.

Field joint coating is also employed during J-lay installation, in which pipe joints are lifted into a near-vertical orientation in a tower for welding to the end of the pipeline. The pipeline hangs near-vertically from the vessel and extends downwardly to a sag bend leading to a touchdown point on the seabed. Field joint coating is carried out downstream of the welding station in the tower, just before launching a newly-added pipe joint into the sea.

In principle, S-lay allows faster pipelaying than J-lay but J-lay is necessary in challenging situations where water depth and strong currents make S-lay impractical without imparting large strains to the pipeline. However, where the pipeline diameter allows, a variant of S-lay called Steep S-lay may be employed in deep water. In Steep S-lay, the pipeline undergoes a deflection through approximately 90° in the overbend from the horizontal firing line to a near-vertical departure angle as it leaves the stinger before extending downwardly to the sag bend that leads to the seabed touchdown point.

The speed of spooling and pipelaying depends upon minimising the timescale of all operations on the critical path. Given the stepwise, sequential processing steps of welding and field joint coating in S-lay and J-lay methods, it is particularly important that neither welding nor field joint coating take longer than is necessary or that one process takes substantially longer than the other. Otherwise there will be a 'bottleneck' in the pipeline installation process.

Similarly, when fabricating pipelines for reel-lay, field joints formed between the successive pipe joints and pipe stalks must be coated before spooling. Thus, welding and field joint coating operations also lie on the critical path for fabricating pipe stalks and for spooling. In this respect, spooling can only take place after a pipe stalk has been welded correctly onto the end of the already-spooled length of pipeline and the resulting field joint has been coated. It follows that delays in welding and field joint coating operations may also affect reel-lay operations, specifically the time that is required to load a pipeline onto a reel-lay installation vessel when that vessel visits a spoolbase.

In any technique for laying rigid pipe, it will be clear that delays in fabricating the pipeline and applying field joint coatings will tie up a valuable capital asset in the form of an installation vessel that may be worth hundreds of millions of US dollars. Delays also increase operational costs of the vessel that may accumulate at a rate of hundreds of thousands of US dollars per day. Delays also risk missing a weather window during which the pipeline can be laid in a satisfactory sea state, which could delay the entire subsea installation project at even greater expense.

As delays may arise while waiting for chemical curing of a thermoset field joint coating or cooling to solidify a thermoplastic field joint coating, various prior art proposals present solutions to quicken this curing step. For example, one of the measures proposed in the aforementioned WO 2012/004665 is to place an insert into the gap between the parent coatings of abutting pipe joints before injecting molten thermoplastics material into a mold placed around that gap, hence to embed the insert. The insert is a prefabricated shell or assembly of thermally insulating material, which may be applied to the pipeline offline as soon as the butt weld of that field joint has been tested. The insert reduces the volume of molten thermoplastics material to inject, mold or cast and hence to cool down, thus reducing injection and cool-down time. This provides a substantial gain in terms of cycle time. It also improves mechanical properties because internal stresses and strains related to material shrinkage following injection or casting can be reduced significantly.

It will be apparent that whether S-lay, J-lay or reel-lay methods are employed to lay rigid pipe, the pipeline—including each of its successive field joint coatings—will experience substantial stresses and strains. Stresses and strains are experienced after a pipeline is laid, for example due to thermal cycling in use. However, stresses and strains are particularly prevalent before and during laying as the pipeline is deflected onto a reel, over an overbend or through a sag bend, as the case may be, during spooling or laying. The stresses and strains are most severe when spooling a coated pipeline onto a reel, which as mentioned above involves plastic deformation of the steel of the rigid pipe. The reel acting as a bending mandrel also imparts concentrated deformation forces directly to the coating that act through the coating on the underlying steel pipe.

When a pipeline undergoes substantial bending, cracks will tend to appear and de-bonding will tend to occur at the interfaces between field joint coatings and parent coatings. The presence of an insert adds further interfaces and gives rise to additional stress and strain concentrations within the field joint coating, which increases the risk of cracks appearing. Any such cracks may allow water to reach the outer surface of the steel pipe, thus corroding the pipe. Water ingress may also reduce the adhesion of the coatings to the pipe and may additionally degrade the coatings themselves. An example of such degradation is hydrolysis of a PU field joint coating under heat emanating from within the pipeline in use, which is particularly significant under the high-pressure conditions of deep water. Degradation or loss of adhesion of the coatings will tend to permit further corrosion of the pipe and to lead to a failure of thermal insulation.

When applying field joint coatings to a reeled pipeline, the approach taken in the prior art to solve the problem of cracking has been to stiffen the field joint coating system. For example in WO 2012/072894, an external stiffener sleeve is used to form a sandwich field joint coating. In WO 2010/049667, a stiffer reinforced part of the field joint coating is molded as a preliminarily step. Disadvantageously, both of those solutions increase the time required to produce the field joint coating.

Other insert designs known in the prior art are solid, thick elastomeric rings such are disclosed in U.S. Pat. No. 4,660,861 and WO 03/095887. Such inserts are bulky items with volume boundaries just smaller than the gap to be filled. Whilst they provide effective thermal insulation and do not extend the cycle time unduly, their stiffness leads to high stresses in the field joint coating that may initiate cracks and lead to failure of the coating. More generally, their stiffness unhelpfully modifies the local bending behaviour of the pipeline, which gives rise to stress concentrations upon bending because the stiffness of the pipeline and particularly of its coatings is not consistent along its length.

Against this background, the present invention seeks to improve resistance to cracking in and around a field joint coating and also to reduce the time required to produce the field joint coating. Counter-intuitively, the invention does so by taking the opposite approach to stiffening the field joint coating system as taught by the prior art. In contrast, the invention provides a solid insert that it is sufficiently pliant to cope with local differential stress and strain concentration between all parts of the field joint coating system during bending of the pipeline.

The prior art also contains bend stiffeners or bend restrictors as disclosed in WO 2013/155172 and U.S. Pat. No. 7,568,861, by way of example. Such prior art is irrelevant to the present invention because it is designed to stiffen a flexible pipeline. This is an entirely different problem to making a bendable solid thermally-insulating insert around a rigid pipeline as required by the present invention.

Against this background, the invention resides in an insulating insert that is positionable around a field joint of a pipeline to insulate the field joint. The insert comprises a longitudinal series of annular or part-annular segments of insulating material, curved about a longitudinal axis, that are each joined to one or more adjacent segments of the series by at least one link. The links are flexible relative to the segments to facilitate bending of the insert along its length by enabling relative angular displacement between adjacent segments of the series.

The links may, for example, be shallower than the segments in a radial direction with respect to the longitudinal axis. In that case, the links may be radially inboard of radially outer faces of the segments. It is also possible for the links to be radially outboard of radially inner faces of the segments.

Conversely, the links may be of substantially the same thickness as the segments in a radial direction with respect to the longitudinal axis.

The links could comprise a more flexible material than the segments, such as one or more flexible rods extending longitudinally between adjacent segments of the series.

In preferred embodiments, the links curve circumferentially between adjacent segments corresponding to the curvature of those segments. The links may be continuous along their circumferential extent or may instead be interrupted by circumferentially-spaced openings defining webs between them that join the adjacent segments.

In another approach, each link could be an articulated assembly of two or more relatively-movable link components. For example, the link components could pivotably or slidably coupled to each other.

Conveniently, the links comprise the same material as the segments. Thus, the links may be integral with the segments.

The series of segments may comprise end segments, one at each end of the series, and two or more body segments between the end segments. To fit the chamfered end of a parent coating, each end segment preferably has a frustoconical concave outer side. Conversely, the body segments may be hollow discs or part-discs spaced along the length of the insert.

The insert preferably comprises two or more part-tubular shell sections that can be brought together around a field joint to form a generally tubular insert. Such shell sections may be pivotably coupled to each other for relative clamshell movement. For example, a pivot plate of a first shell section may be pivotably engaged with a pivot pin of a second shell section. The pivot pin may project from at least one segment of the second shell section.

The insert of the invention may be coated or overmolded with an adhesive or polymer coating or layer extending along the length of the insert.

In preferred embodiments, the links are of a more flexible material than the segments, infilled between segments by molding around the segments or by assembly with the segments. For example, each link may comprise: one or more flexible webs that bridge a gap between adjacent segments and that may be integral with the adjacent segments; and an infill of a more flexible material than the segments that fills the gap between the adjacent segments.

The inventive concept embraces a rigid pipeline comprising the insert of the invention, positioned around a field joint of a pipeline to insulate the field joint. The insert may be embedded in a polymer field joint coating or positioned over a sealing sleeve applied over the field joint, which sleeve bridges a longitudinal gap between truncated parent coatings of pipe joints joined at the field joint.

When the pipeline is bent along its length, the insert is also bent along its length and adjacent segments of the insert are angularly displaced relative to each other about the links between those segments.

The inventive concept extends to methods of insulating a pipeline field joint, comprising applying an insert of the invention to surround the field joint after joining pipe joints to make the field joint. Subsequently, the pipeline may be bent along its length to cause the insert to bend along its length.

In preferred embodiments, the invention provides a solid insulating device for participating in thermal insulation of a field joint of a rigid pipeline, the device being installed around the field joint. The device preferably comprises at least two longitudinally-distinct insulating sections whose radial and longitudinal thickness is sufficient to ensure thermal insulation of the rigid pipeline, and at least one pliant link between the at least two insulating sections. The insulating sections are preferably substantially perpendicular to the axis of the pipeline and may, for example, be disc-shaped or prismatic.

The rigid pipeline suitably comprises a succession of coated steel pipe joints that are joined end-to-end at the field joints. The outer diameter of an insulating section of the device is suitably less than or equal to the outer diameter of a parent coating of the rigid pipeline.

The pliant link suitably extends in longitudinal direction. In some embodiments, the pliant link may comprise a rigid pin, whereby the interface with at least one insulating section may be a pivot connection.

The pliant link could be a substantially flexible rod or a cylindrical sleeve integral with the insulating section and encircling the pipeline. In that case, the material and thickness of the cylindrical sleeve suitably allows at least 2% bending strain without damage.

The insert may comprise a plurality of pliant links combining any of the types outlined above.

The invention thus provides a field joint coating system comprising the abovementioned solid insulating device for ensuring continuity of thermal insulation at field joints of a rigid pipeline. The field joint coating system suitably further comprises at least one layer of polymer thermal insulation material molded around the solid insulating device, for example by injection molding.

The invention also provides a method of ensuring continuity of thermal insulation across at least one field joint of a rigid pipeline, the method comprising positioning a solid insulation device as described above around the field joint after joining two successive pipe joints of the pipeline. Molten thermoplastic material may then be injected into a mold arranged around the field joint to embed the device in a field joint coating.

In order that the invention may be more readily understood, reference will now be made, by way of example, to the accompanying drawings in which.

Figure 2:
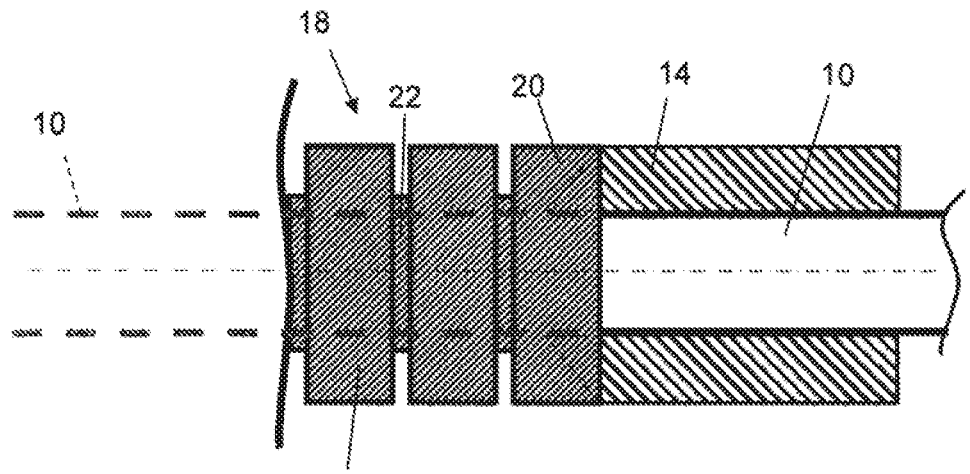
FIG. 2 is a schematic part-sectional side view of a pipeline field joint fitted with an insulating insert in accordance with the invention.
Figure 3:
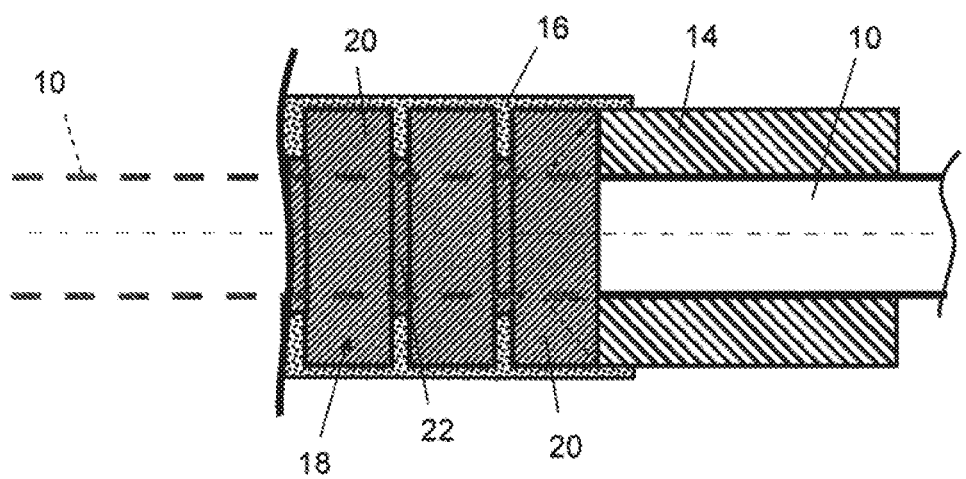
Figure 4:
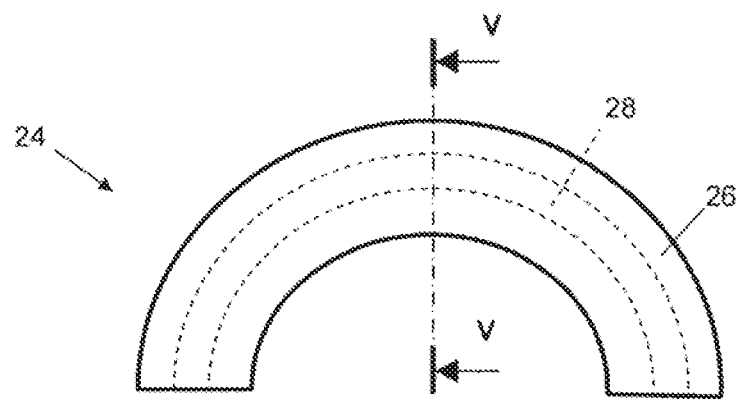
Figure 5:
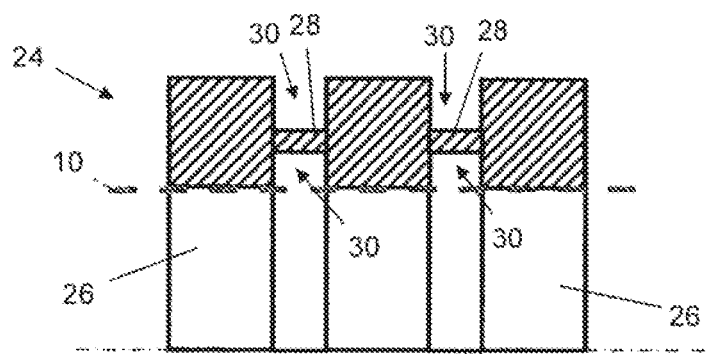
Figure 6:
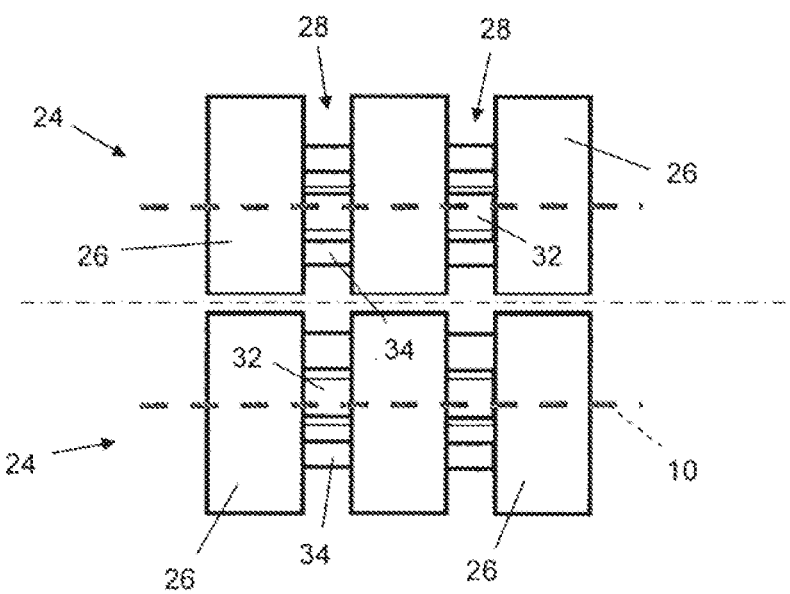
Figure 10:
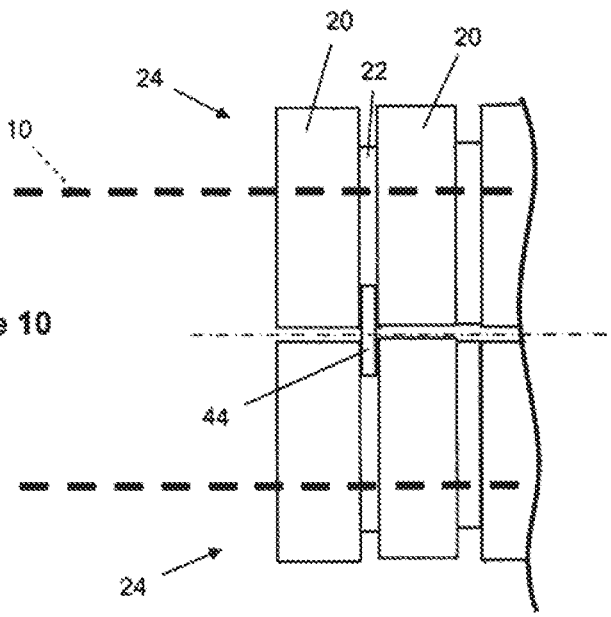
Figure 11:
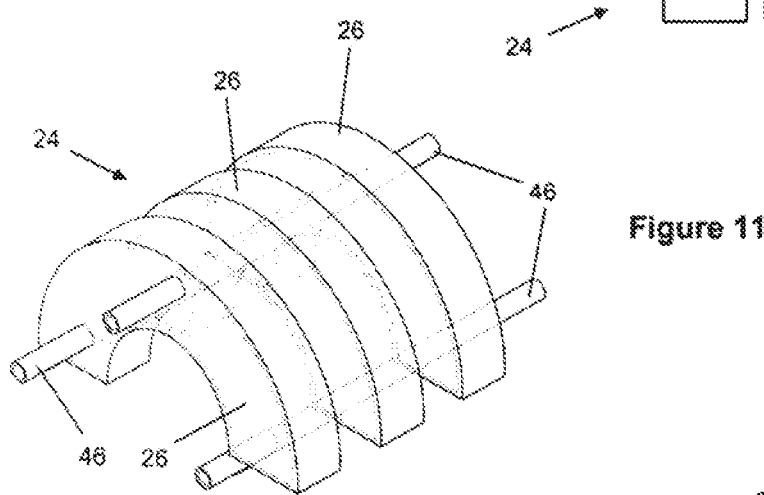
Figure 12:
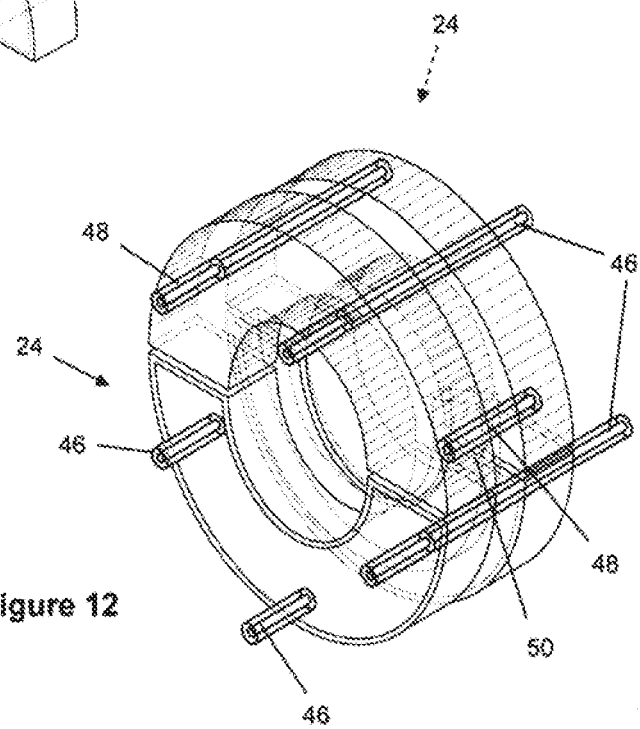
Figure 14A:
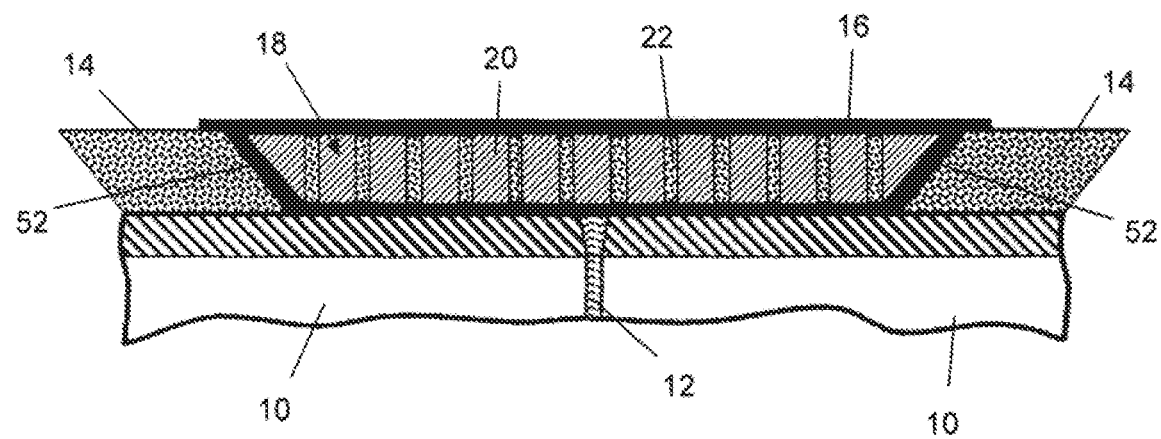
Figure 14B:
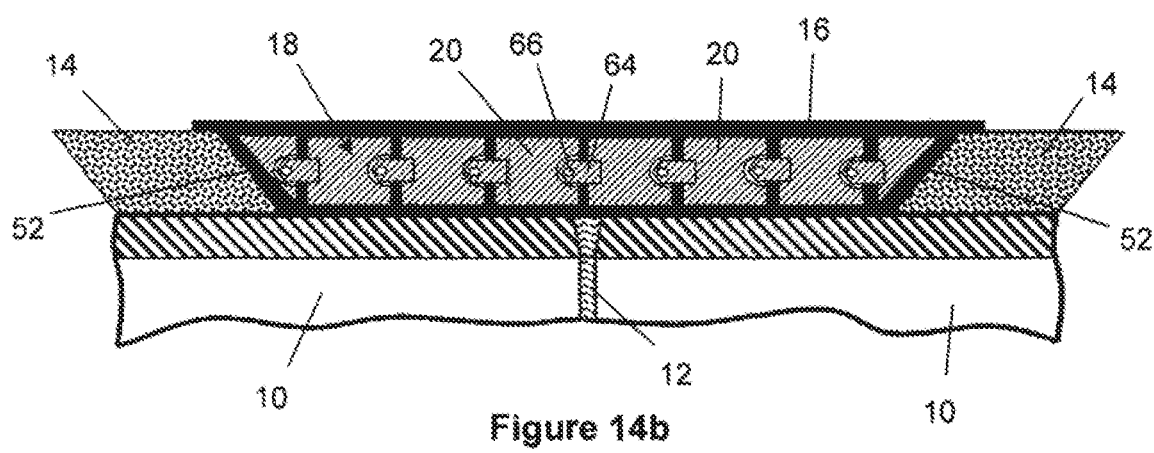
Figure 15A:
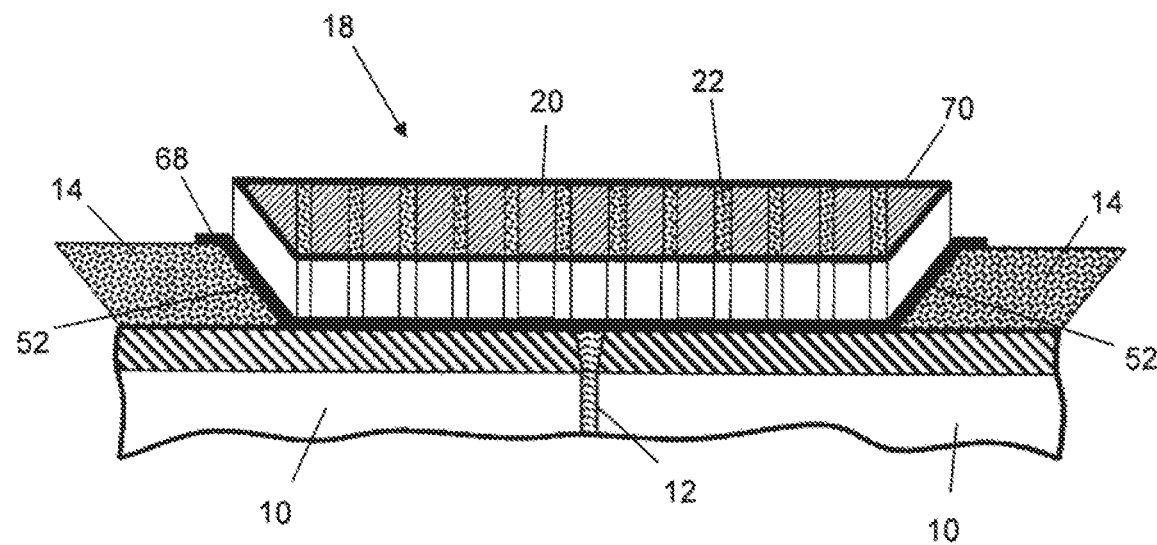
Figure 15B:
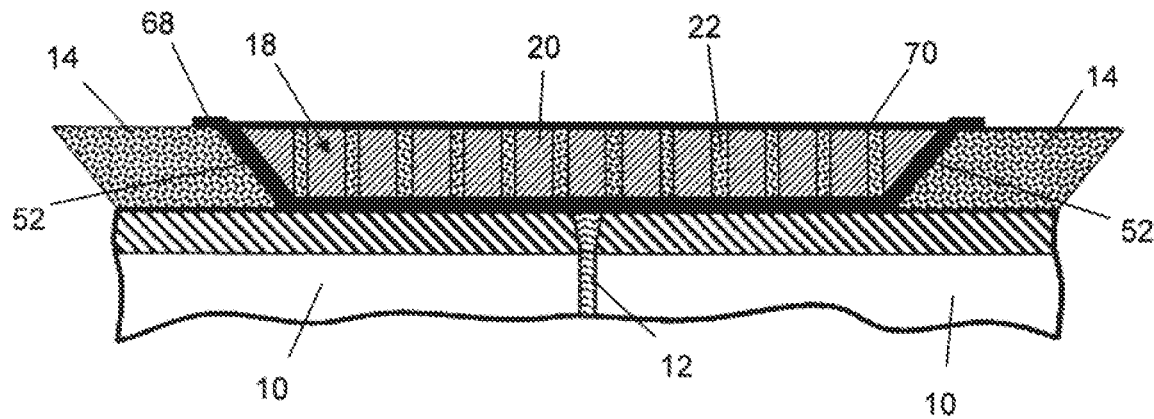
Figure 16:
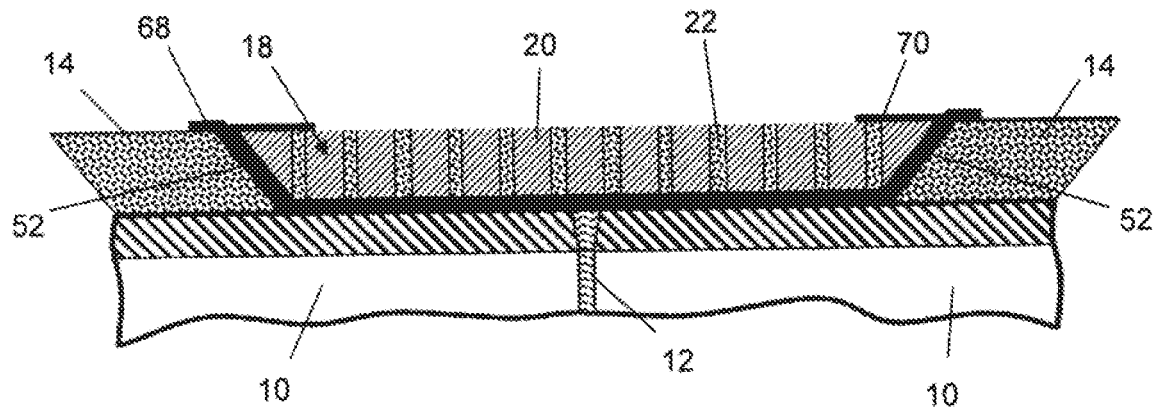
Figure 17:
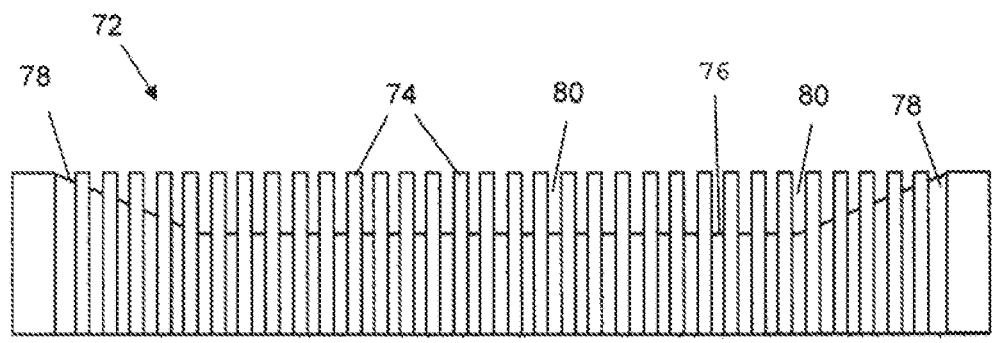
Figure 18:
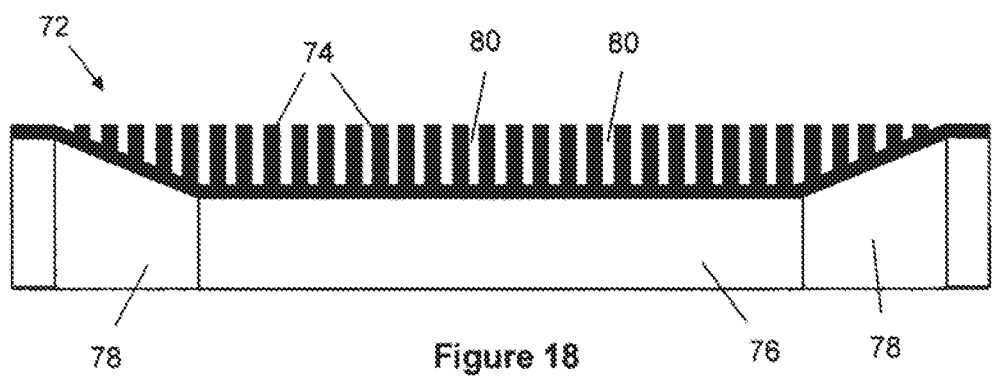
Figure 19:
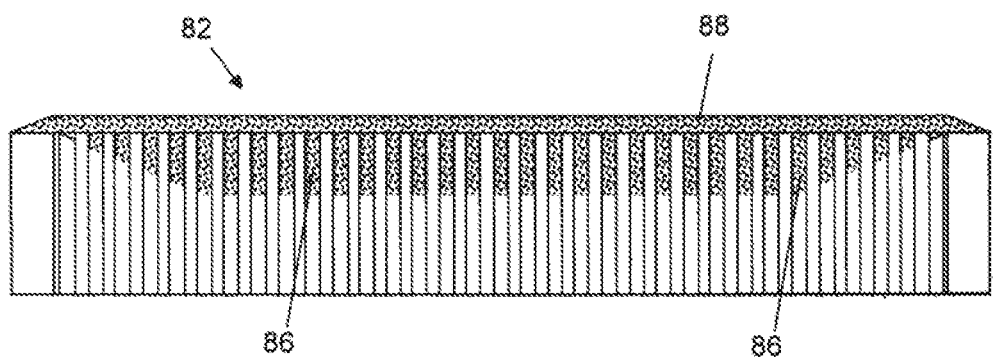
Figure 20:
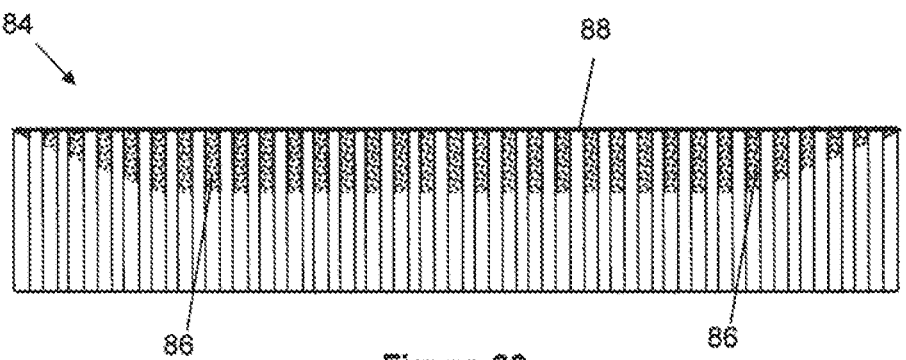
Figure 21:
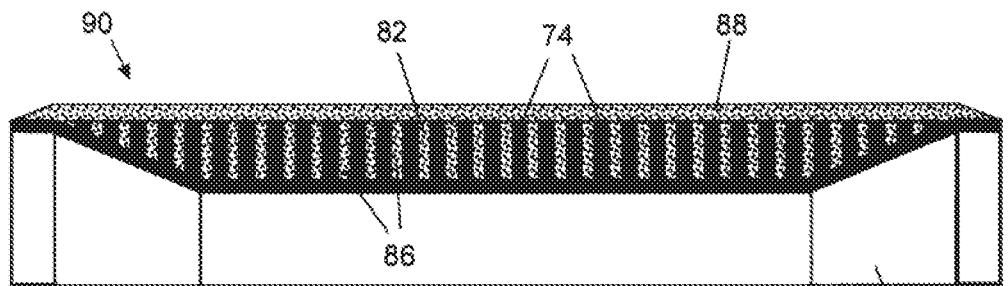
Figure 22:
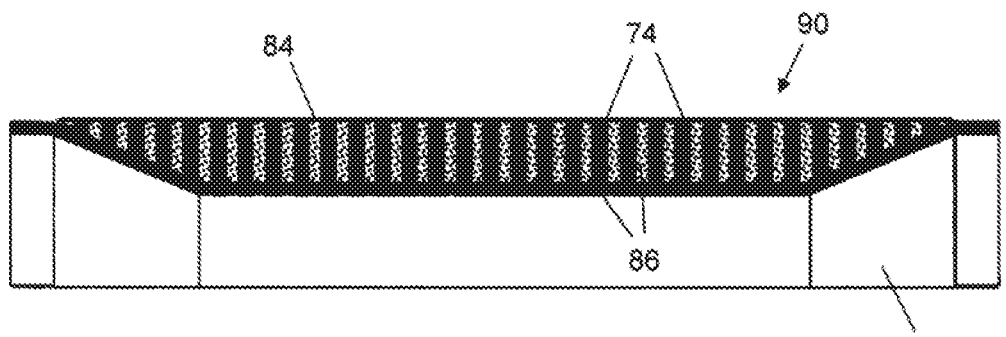
Figure 23:
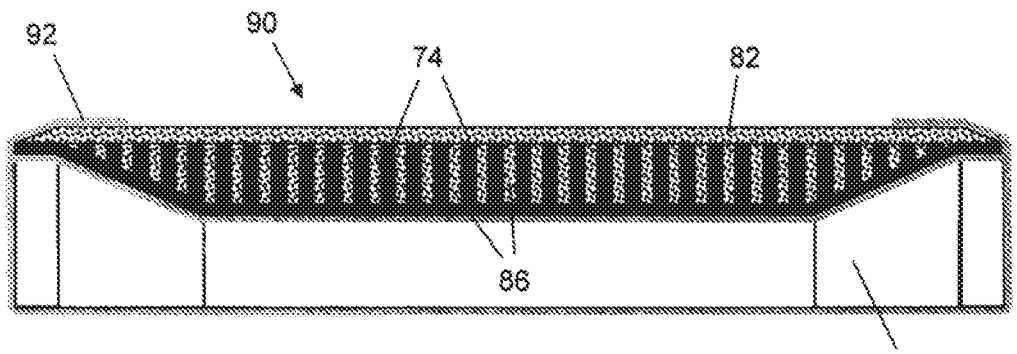
Figure 24:
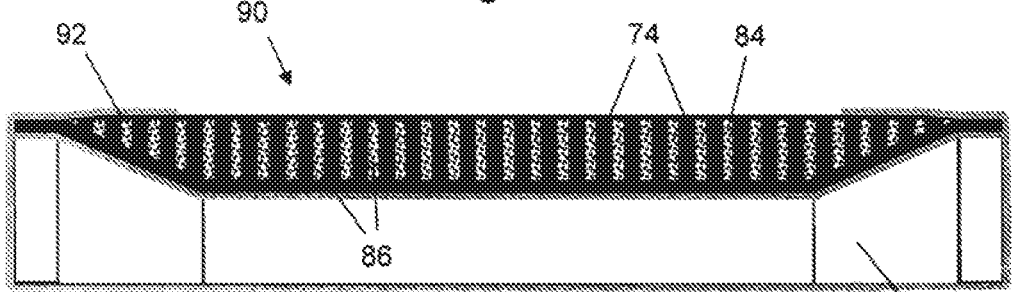
Figure 25:
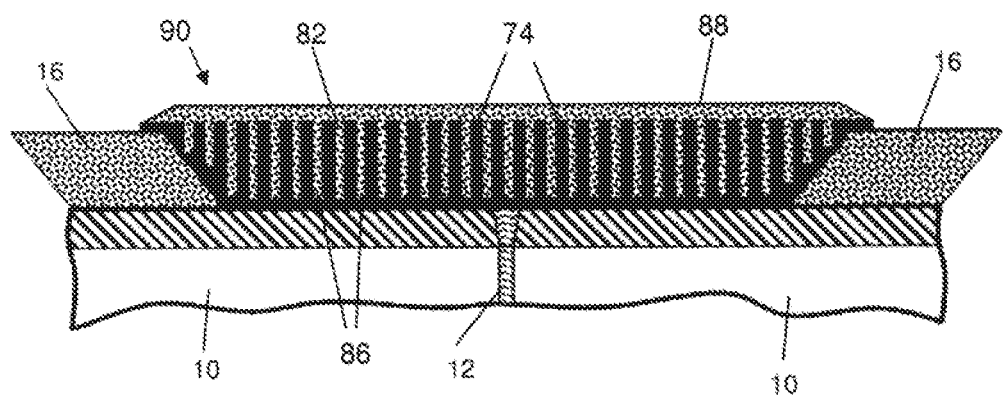

FIG. 3 corresponds to FIG. 2 but shows the insert embedded in an over-molded polymer field joint coating;

FIG. 4 is a schematic end view of segments of an insulating insert in accordance with the invention;

FIG. 5 is a sectional side view taken on line V-V of FIG. 4;

FIG. 6 is a schematic plan view of segments of an insulating insert in accordance with the invention that together define a part-tubular shell, in a variant of the embodiment shown in FIGS. 4 and 5;

FIG. 7 is a partial schematic side view of segmented part-tubular shells held together around a pipe by hinging clips;

FIG. 8 is an enlarged view of detail VIII in FIG. 7;

FIG. 9 is a sectional view on line IX-IX of FIG. 8;

FIG. 10 corresponds to FIG. 7 but shows another way of holding together the segmented part-tubular shells around a pipe;

FIG. 11 is a perspective view of segments of a part-tubular shell linked by flexible longitudinal rods;

FIG. 12 is a perspective view of opposed segmented part-tubular shells like those of FIG. 11, showing a hinge arrangement between the opposed shells;

FIGS. 13a to 13d are a sequence of schematic sectional side views showing segmented part-tubular shells being assembled around a pipeline field joint and then being embedded in a molded polymer coating;

FIGS. 14a and 14b are schematic sectional side views showing other ways in which segments of an insert may be linked by joints in accordance with the invention;

FIGS. 15a and 15b are a sequence of schematic sectional side views showing a segmented part-tubular shell being placed around a pipeline field joint without being embedded in a molded polymer coating;

FIG. 16 is a sectional side view showing a variant of the segmented part-tubular shell shown in FIGS. 15a and 15b;

FIG. 17 is a side view of a segmented part-tubular shell in a preferred embodiment of the invention;

FIG. 18 is a sectional side view of the segmented part-tubular shell of FIG. 17;

FIG. 19 is a sectional side view of an infill moulding shaped to fit the segmented part-tubular shell of FIGS. 17 and 18;

FIG. 20 is a sectional side view of a variant of the infill molding of FIG. 19;

FIG. 21 is a sectional side view of the infill molding of FIG. 19 fitted into the segmented part-tubular shell of FIGS. 17 and 18;

FIG. 22 is a sectional side view of the infill molding of FIG. 20 fitted into the segmented part-tubular shell of FIGS. 17 and 18;

FIG. 23 is a sectional side view of the combination of the segmented part-tubular shell of FIGS. 17 and 18 and the infill molding of FIG. 19, partially covered by a skin;

FIG. 24 is a sectional side view of the combination of the segmented part-tubular shell of FIGS. 17 and 18 and the infill molding of FIG. 20, partially covered by a skin like that shown in FIG. 23; and FIG. 25 is a schematic sectional side view showing the insert of FIG. 21 embedded in polymer field joint coating.

Figure 1:
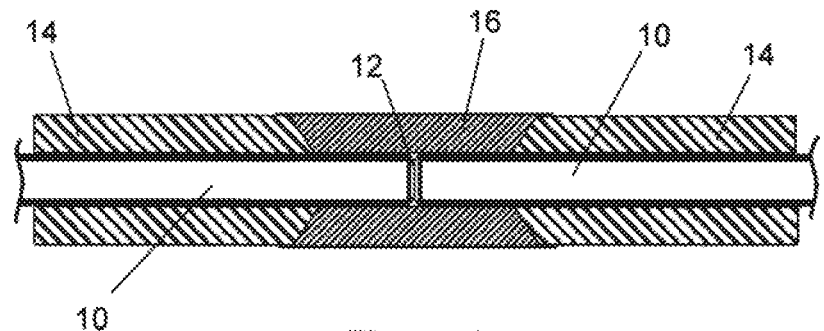
FIG. 1 is a schematic sectional side view of a coated field joint of a pipeline as known in the prior art.

In the prior art arrangement shown in FIG. 1, a field joint is created between abutting pipe joints 10 of a pipeline, where a circumferential butt weld 12 attaches the pipe joints 10 to each other end-to-end. Each pipe joint 10 is coated with an insulating parent coating 14, for example a SLPP coating, that terminates short of the facing end of each pipe joint 10 with a typically chamfered end shape. An annular gap lies between the opposed chamfered ends of the parent coatings 14 around the weld 12, where the exposed external surfaces of the pipe joints 10 are coated with an insulating field joint coating 16 that substantially matches the radial thickness of the parent coatings 14.

In this description, references to the radial direction are defined with respect to the central longitudinal axis of a pipe joint 10, which is also the center of curvature of the pipe joints 10, the coatings 14, 16 and other tubular or part-tubular features.

As acknowledged in the introduction, the field joint coating 16 may be made using a mold tool fixed around the field joint. The mold tool extends from one parent coating 14 to the other and overlaps those coatings 14 to define a mold cavity that includes the annular gap between the coatings 14 and that surrounds the field joint. A liquid polymer such as PU or PP is injected or otherwise introduced into the mold cavity to harden in the mold cavity before the mold tool is removed to coat another field joint of the pipeline.

Figure 13A:
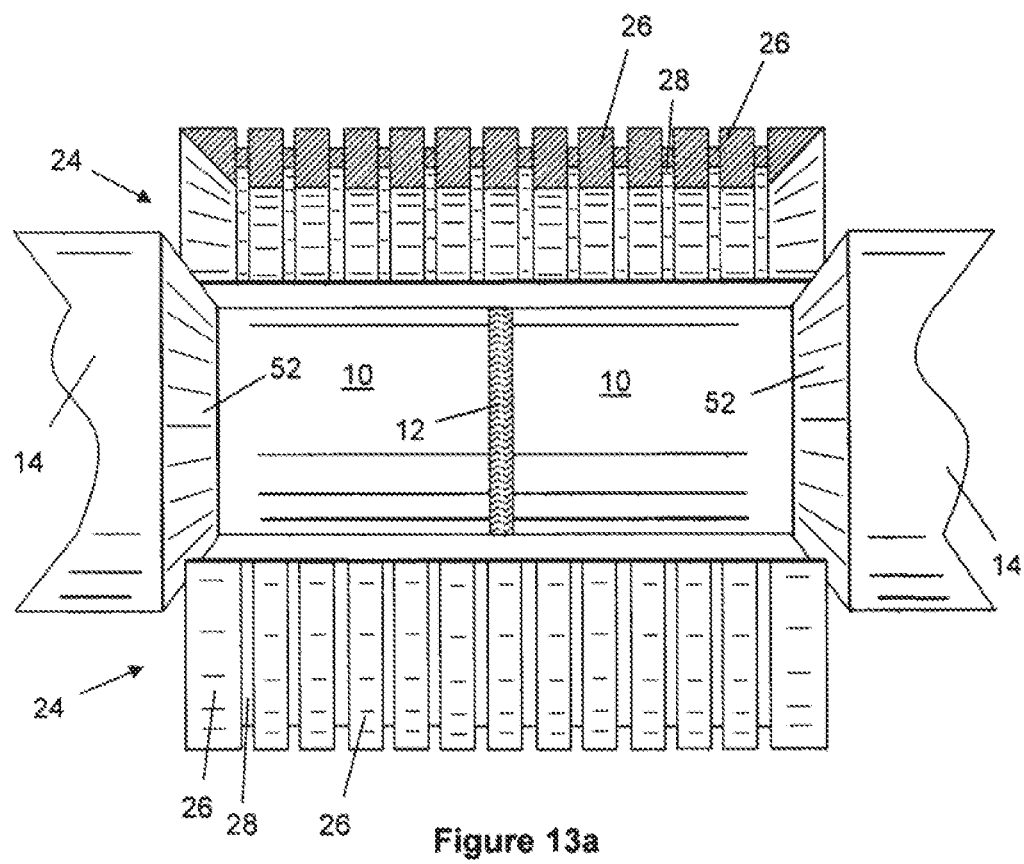
Figure 13B:
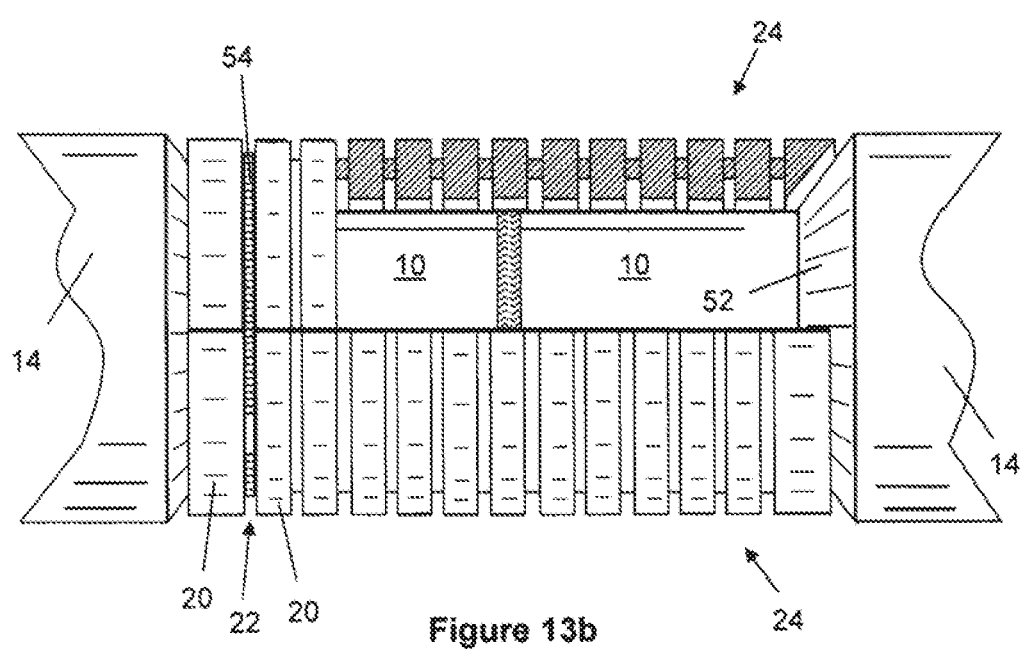
Figure 13C:
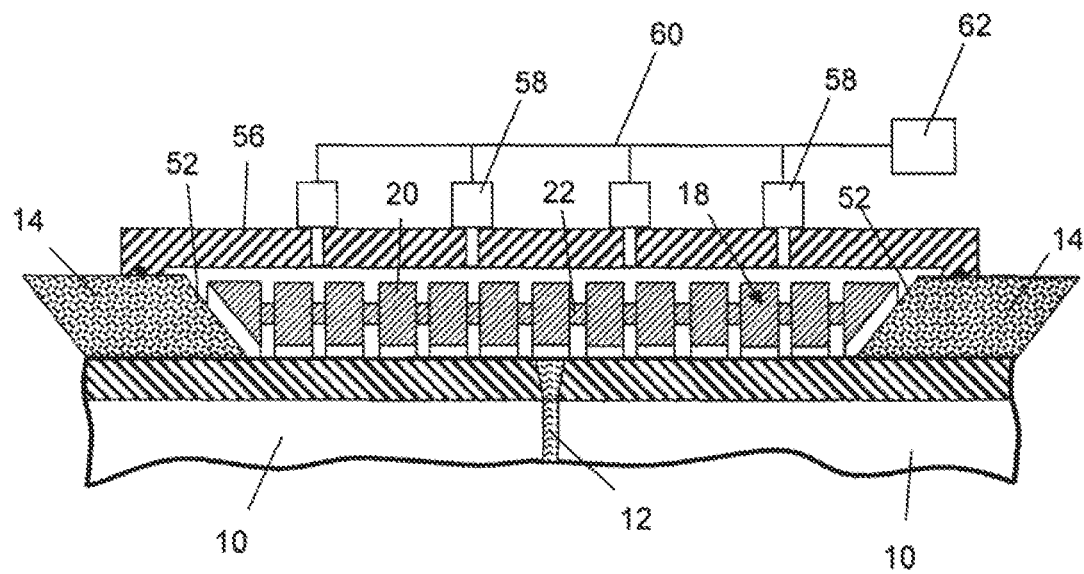

Mold tools suitable for producing a field joint coating 16 are described in outline with reference to FIG. 13c of the appended drawings and in more detail in our aforementioned International patent application published as WO 2012/004665. Whilst injection-molding of thermoplastics is preferred for the purposes of the invention especially when combined with the teachings of WO 2012/004665, such as sequential cascade injection—the invention is not confined to that possibility. For example, cast molding of a PU field joint coating is possible; more broadly, molding itself is optional rather than essential as will now be explained.

FIGS. 2 and 3 show, schematically, a tubular insulating insert 18 in accordance with the invention placed around a field joint of a pipeline. Only one pipe joint 10 of the pipeline is shown here for simplicity, coated with a chamfered parent coating 14 like that of FIG. 1. Dashed lines show the outline of the pipe joint 10 extending through a central lumen of the insert 18. The dashed lines continue through the insert 18 to show the outline of an abutting pipe joint 10 welded end-to-end.

The basic geometry of the insert 18 fits into a virtual tubular volume in the shape of a thick-walled hollow cylinder but it is not limited to such a shape. In general terms, the insert 18 has a radially outer face whose external diameter is slightly less than or substantially equal to the external diameter of the abutting pipe joints 10, including their parent coatings 14. The insert 18 also has a radially inner face whose internal diameter is substantially equal to or slightly greater than the external diameter of the pipe joints 10.

The insert 18 shown in FIGS. 2 and 3 comprises a longitudinal series of segments 20 connected by joints or links 22, such that the segments 20 alternate with the links 22 along the length of the insert 18. The links 22 facilitate slight relative angular movement or misalignment between adjacent segments 20 as the pipeline bends along its length. Narrow gaps between the segments 20 radially outboard of the links 22 provide clearance for that relative movement. Broadly, therefore, the segments 20 and links 22 of the insert 18 together behave like a vertebral column or spine, in which the segments 20 are akin to vertebrae and the links 22 are akin to intervertebral discs interleaved between the vertebrae.

The segments 20 are preferably of substantially solid thermally-insulating material such as GSPP. The links 22 are flexible relative to the segments 20. The segmented, jointed arrangement of the insert 18 confers flexibility on the insert 18 to bend along its length in response to corresponding bending of the pipeline. The readiness of the insert 18 to bend in this way reduces stress in a field joint coating 16 that incorporates the insert 18. This reduces initiation and propagation of cracks in the field joint coating 16 and between that coating 16 and the adjacent parent coatings 14.

The insert 18 can bend without significantly affecting its ability to insulate the pipeline. In this respect, it will be noted that the insulating segments 20 extend to substantially the same depth in the radial direction as the thickness of the parent coating 14. Also, the segments 20 are able to withstand radially-inward compressive forces experienced by the pipeline during spooling and installation and under hydrostatic pressure in use.

The links 22 could be intrinsically flexible by virtue of their material or their cross-sectional shape or dimension. Alternatively, each link 22 could comprise two or more substantially rigid parts that are hinged, jointed or articulated to confer flexibility on the link 22 as a whole. An insert of this type is described with reference to FIG. 14b of the drawings The links 22 may be of the same material as the segments 20 or of a different material. If they are of the same material as the segments 20, the links 22 may be integral with the segments 20 and may be relatively shallow or thin in the radial direction to confer greater relative flexibility on the links 22. For example, the links 22 shown in FIGS. 2 and 3 are thin webs that bridge the gaps to connect adjacent segments 20. Indeed, the links 22 and segments 20 may all be integral with each other in a one-piece insert 18, which could be machined into its final shape from a molded or cast block of material or molded directly in that final shape. Conversely, the insert 18 could be an assembly of elements comprising a plurality of segments 20 and a plurality of links 22. Such elements may or may not be of the same material.

If of a different material to the segments 20, the links 22 may be of more flexible material than the segments 20. Inserts of this type are described with reference to FIGS. 14a, 15a and 15b of the drawings. In that case, the links 22 need not be shallower or thinner in the radial direction than the segments 20, although they could be.

In the simplified example shown in FIGS. 2 and 3, the segments 20 and links 22 are annular discs or hoops that encircle the pipe joints 10 and are integral with each other to form a one-piece insert 18. The segments 20 and the links 22 are flush on their radially inner sides where the radially inner face of the insert 18 lies against the underlying pipe joints 10. However, the links 22 are substantially shallower in the radial direction than the segments 20, thus defining a castellated longitudinal section on the radially outer face of the insert 18. The resulting gaps between adjacent segments 20 allow for relative angular displacement between the segments 20 as the pipeline and hence the insert 18 bends along its length.

FIGS. 2 and 3 show one of two end segments 20 of the insert 18 and two adjacent body segments 20 of the insert 18. There may be considerably more than two body segments 20 between the end segments 20, depending upon the length of the insert 18 and the length, diameter and radial thickness of the segments 20. This, in turn, depends upon the length of the gap between the parent coatings 14, the thickness of the parent coatings 14 and the diameter of the pipe joints 10. More generally, the dimensions and numbers of segments 20 and links 22 may depend on the material type, coating performance requirements and expected strains that determine the requirement for resilience in the field joint and its coating 16.

The end segment 20 has a hollowed frusto-conical concave outer side to correspond to the opposed convex contour of the chamfer at the end of the adjacent parent coating 14, shown here in dotted lines. The inner side of the end segment 20, and both sides of each body segment 20, are flat and lie in parallel planes that are orthogonal to the central longitudinal axis of the pipe joints 10.

It has been calculated that in some cases, the solid but bendable insert 18 could provide sufficient thermal insulation by itself without being covered by an additional field joint coating 16. This stand-alone option is shown in FIG. 2. In that case, it may be sufficient to interpose a sealing protective sleeve between the pipe joints 10 and the insert 18. Such a sleeve is omitted from FIG. 2 for simplicity but is described further with reference to FIGS. 15a and 15b below. For example, as is well known, the field joint could be covered by a tight heat-shrunk plastics sleeve. When applied, such a sleeve has a narrow-waisted hourglass shape by virtue of contracting radially inwardly onto the radially-outer surfaces of the respective parent coatings 14, their chamfered ends and the exposed surfaces of the pipe joints 10 between. In that case, the insert 18 could simply be secured around the sleeved field joint in the waisted gap between the parent coatings 14.

FIG. 3 shows the alternative of embedding an insert 18 in an over-molded field joint coating 16 that is cast or injected around an insert 18 already secured around the field joint. In that case, a sleeve need not be interposed between the pipe joints 10 and the insert 18, although it could be. It will be apparent here that the field joint coating 16 overlaps the ends of the gap between the parent coatings 14, thus extending slightly onto the radially-outer surfaces of the parent coatings 14. The resulting minor local increase in the diameter of the pipeline is inconsequential for subsequent operations such as spooling.

In practice, the hoop-like segments 20 and links 22 of the simplified insert 18 shown in FIGS. 2 and 3 will be divided into a combination of part-tubular sections to enable the insert 18 to be applied to the pipe joints 10. Those sections are shaped to constitute a hollow cylinder or tube when assembled or brought together around the pipe joints 10. For example, FIGS. 4 to 6 show parts of half-shell sections 24 comprising a series of three arched segment portions 26 linked by two arched joint portions 28. Each half-shell section 24 is shaped to extend around half of the circumference of a pipe joint 10. Thus, a combination of two opposed abutting half-shell sections 24 encircles the pipe joint 10 as shown in FIG. 6.

In FIGS. 4 to 6, like FIGS. 2 and 3, the radially inner bases of the segment portions 26 are arranged to lie against the pipe joints 10 as shown in dashed lines in FIGS. 5 and 6. Unlike FIGS. 2 and 3, however, the joint portions 28 are radially outboard of the bases of the segment portions 26, at radially intermediate positions with respect to the radial thickness of the segment portions 26. This leaves gaps 30 between adjacent segment portions 26 on both the radially inner and the radially outer side of each joint portion 28, optimising flexibility for bending in two directions along the length of a pipeline. The joint portions 28 could be positioned at any radial depth with respect to the adjacent segment portions 26, depending upon the mechanical behaviour of the system comprising the pipe joints 10, the coatings 14, 16 and the insert 18.

The joint portions 28 shown in FIG. 6 differ from the joint portions 28 shown in FIGS. 4 and 5. Specifically, the joint portions 28 shown in FIGS. 4 and 5 are circumferentially continuous and uninterrupted like the links 22 of FIGS. 2 and 3. In contrast, each joint portion 28 shown in FIG. 6 is discontinuous, being interrupted by circumferentially-spaced openings 32 to leave a series of circumferentially-spaced webs 34 that together bridge the gaps 30 between adjacent segment portions 26.

The openings 32 alternating circumferentially with the webs 34 improve the flow of liquid polymer through the mold cavity and around the insert 18 during over-molding of the insert 18 around a field joint. This improves mold filling including expulsion of air from within the mold cavity and improves keying between the cured polymer and the insert 18 by virtue of intimate, multi-interface contact over a larger surface area. This reduces the possibility of the cured polymer peeling or cracking away from the insert 18 when the pipeline is bent along its length.

Turning next to FIGS. 7 to 10, these show how part-tubular sections of an insert 18 such as half-shell sections 24 can be linked to hold them together around pipe joints 10. Again, the pipe joints 10 are represented by dashed lines in FIG. 7. In this example of fastenings disposed on the half-shell sections 24, a spigot 36 projecting tangentially from a facing edge of a first half-shell section 24 is received in a transverse slot 38 in an opposed facing edge of a second half-shell section 24 opposed to the first half-shell section 24. As best seen in the enlarged detail view of FIG. 8, the spigot 36 has an enlarged head 40 that snap-fits resiliently into opposed undercut recesses 42 on both sides of the slot 38 when the half-shell sections 24 are pressed together. Similar snap-fit fastenings may be distributed along the length of the insert 18 and to both sides of the insert 18.

FIG. 9 shows a refinement of the fastening shown in FIGS. 8 and 9, namely that the fastening is arranged to serve as a pivot or hinge for the half-shell sections 24 to close around the pipe joints 10 in a clamshell arrangement. The half-shell sections 24 pivot relative to each other about a longitudinal axis extending parallel to the pipe joints 10.

For this purpose, the head 40 of the spigot 36 has a cylindrical profile of circular cross-section and the recesses 42 opposed about the slot 38 have complementary circular cross-sections. The slot 38 provides clearance for the spigot 36 to hinge about its head 40 located in the recesses 42 and hence for the first half-shell section 24 to swing open or closed relative to the second half-shell section 24.

FIG. 10 shows an alternative fastening comprising a key 44 that, by resilient engagement or a snap-fit, engages with and bridges aligned grooves of the first and second half-shell sections 24 corresponding to the link 22 in a gap between adjacent segments 20. If desired, the key 44 could be pivotably attached to one or both of the half-shell sections 24 to serve as a hinge for opening and closing the half-shell sections 24 like a clamshell.

FIGS. 11 and 12 show another approach to providing links 22 between the segments 20, namely to use flexible, parallel rods 46 that extend longitudinally between successive spaced segment portions 26 of a half-shell section 24. Preferably, as shown, the rods 46 extend through holes in the segment portions 26 from one segment portion 26 to the next. Indeed, the rods 46 may extend along the full length of an insert 18 between end segments 20 and through an intermediate series of body segments 20. As the pipeline bends along its length, the rods 46 also bend along their length to allow relative angular deflection between the segments 20. Circumferential gaps between the rods 46 equate to the openings 32 between the webs 34 of FIG. 6, and have similar benefits.

FIG. 12 shows a refinement of FIG. 11 in which a further parallel hinge rod 48 extending between adjacent spaced segment portions 26 is used as a fulcrum to create a hinge between opposed half-shell sections 24. Here, two adjacent segments 20 are shown, each comprising opposed semi-circular segment portions 26 of the respective half-shell sections 24. The hinge rod 48 extends between the segment portions 26 of the first half-shell section 24. The segment portions 26 of the second half-shell section 24 sandwich a hinge plate 50, one end of which protrudes into the gap between the adjacent segment portions 26 of the first half-shell section 24. The hinge rod 48 extending between the adjacent segment portions 26 of the first half-shell section 24 also extends through the protruding end of the hinge plate 50. This links the two half-shell sections 24 for clamshell movement to surround and clamp around the pipe joints 10 shown in preceding drawings.

Turning next to FIGS. 13a to 13d, these show steps for placing an insert 18 around a field joint and then overmolding the insert 18 with a field joint coating 16. The insert 18 shown in these and most of the succeeding figures comprises numerous segments 20 and links 22 for maximum flexibility. In practice, an insert 18 may have fewer segments 20 and links 22 but will generally have at least two, and preferably at least four, body segments 20 between the opposed end segments 20. For simplicity, the links 22 between segments 20 of the insert 18 are shown here as being circumferentially continuous but they could be provided with a series of openings as shown in FIG. 6. Other joint configurations are of course possible.

Here, as in FIG. 1, a field joint is created between abutting pipe joints 10 where a circumferential butt weld 12 attaches the pipe joints 10 end-to-end. Each pipe joint 10 is coated with an insulating parent coating 14 that terminates in a chamfered end 52, leaving a short length of the pipe joints 10 uncoated on each side of the weld 12.

As a preliminary step, the bare uncoated external surfaces of the pipe joints 10 are cleaned and primed, as are the chamfered ends 52 of the parent coatings 14. Next, FIG. 13a shows two full-length half-shell sections 24 of the insert 18 being brought together around the field joint in alignment with the annular gap between the opposed chamfered ends 52. A first half-shell section 24, which is uppermost in the drawings, is in longitudinal section to show its interior whereas the exterior of the second half-shell section 24 is shown in FIG. 13a.

In FIG. 13b, the half-shell sections 24 have been brought together about the field joint to abut along their opposed facing edges and hence to fill most of the annular gap between the opposed chamfered ends 52. A circumferential tensile band 54 is shown located in aligned grooves of the first and second half-shell sections 24 corresponding to a link 22 in a gap between adjacent segments 20. The band 54 is tightened around the half-shell sections 24 to serve as a fastening in this example. The first half-shell section 24 is in partial longitudinal section in FIG. 13b to show the path of the band 54.

Figure 13D:
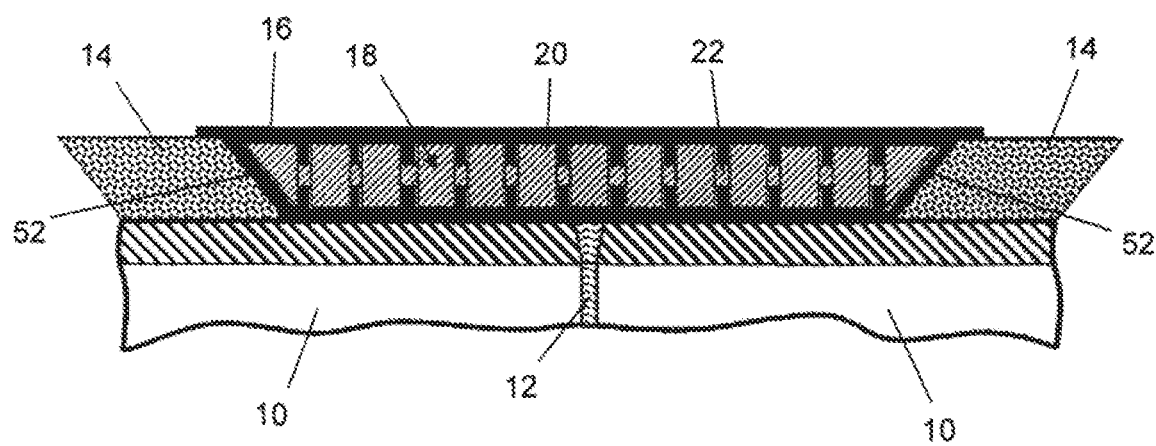

FIGS. 13c and 13d show the pipe joints 10 in longitudinal section and focus upon the first half-shell section 24 of the insert 18, it being understood that the second half-shell section 24 is a mirror-image about the central longitudinal axis of the pipe joints 10.

FIG. 13c shows a mold tool that comprises a tube 56 of generally circular cross-section, which is suitably divided longitudinally on a diameter of the cross-section into two halves. Only one of those halves is shown in FIG. 13c. Opposed end portions of the tube 56 seat against the parent coatings 14 of the respective pipe joints 10 and so have an internal diameter corresponding to the external diameter of the coated pipe joints 10. A central portion of the tube 56 aligned with and extending slightly beyond the gap between the parent coatings 14 has an increased internal diameter that exceeds the external diameter of the coated pipe joints 10. This enlarges the mold cavity within the tube 56 to allow for shrinkage of the injected plastics material as that material cools, and provides for the resulting field joint coating 16 to overlap slightly onto the radially-outer surfaces of the parent coatings 14 as also shown in FIG. 3.

The uncoated surfaces of the pipe joints 10, the insert 18 and the chamfered ends 52 of the parent coatings 14 are suitably heated before molding. Then, the two halves of the mold tool are assembled together to form the tube 56 encircling the field joint and are clamped together to hold the mold tool in sealing engagement with the parent coatings 14 and to resist internal pressure within the mold cavity in use.

It will be noted from FIGS. 13c and 13d that there are narrow gaps or clearances of broadly similar width or thickness between the insert 18 and the chamfered ends 52 of the parent coatings 14, the exposed outer surfaces of the pipe joints 10 and the inner surface of the tube 56 of the mold tool. Preferably, those various gaps are also similar to the gaps between segments 20 of the insert 18 that accommodate the links 22. Consequently, as will be noted from FIG. 13d, the parts of the field joint coating 16 that surround, embed and extend through the insert 18 are of broadly similar thickness throughout. This promotes uniformity of flow of liquid polymer as the mold cavity fills, and especially speed and uniformity of cooling if the field joint coating 16 is of thermoplastics material. This beneficially reduces stresses in the field joint coating 16 and between the field joint coating 16 and the insert 18 due to differential shrinkage or curing.

The tube 56 of the mold tool is penetrated by one or more gates 58 for injection into the mold cavity of liquid polymer supplied through feed lines 60 under pressure from a supplying reservoir or machine 62. The gates 58 are preferably aligned with gaps between segments 20 of the insert 18 as shown to promote flow of the injected polymer within the mold cavity.

As is known from prior art such as WO 2012/004665, each gate 58 may have a respective valve that controls the injection of liquid polymer through that gate 58. The valves may be controlled by a central control unit and may be operated independently of each other. These and other common mold tool features have been omitted from FIG. 13c for simplicity, such as vents to allow air to escape as the mold cavity fills with liquid polymer, and external clamps. Also, if the liquid polymer is of molten thermoplastics, a cooling system may be provided. The cooling system may, for example, comprise a water jacket disposed in or on the tubular wall of the mold tool.

In a production line or firing line comprising a sequence of stations including welding and testing stations, an insert 18 may be placed around a field joint at an upstream coating station before a mold tool is positioned around the field joint and the insert 18 at a downstream coating station.

FIGS. 14a and 14b show inserts 18 with other joint arrangements, the inserts 18 in both cases being shown in situ on a field joint of a pipeline comprising coated pipe joints 10 joined by a weld 12. In each case, the insert 18 is overmolded with a polymer field joint coating 16.

In the insert 18 shown in FIG. 14a, the links 22 are of a different, more flexible material than the segments 20. In this case, as shown, the links 22 may be as thick in the radial direction as the segments 20, which has the benefit of maximising insulation. For example, the links 22 could be of a resilient rubber or gel-like material that may be interleaved between the segments 20 or molded between the segments 20.

In the insert 18 shown in FIG. 14b, the links 22 comprise solid coupling parts, namely an arm 64 of one segment 20 that extends to engage with a pivot pin 66 of an adjacent segment 20. These coupling parts 64, 66 are rigidly attached to the respective segments 20 but are pivotably and/or slidably coupled to each other. This provides articulation that allows for relative pivotal and/or longitudinal movement between the adjacent segments 20 as the pipeline and hence the insert 18 bends along its length. The insert 18 shown in FIG. 14b has fewer segments 20 than the insert 18 shown in FIG. 14a.

Turning next to FIGS. 15a and 15b, these show how it is possible to use a bendable insert 18 of the invention to insulate a field joint without necessarily overmolding a field joint coating 16 around the insert 18. Here, a tightly-sealing protective sleeve 68 of heat-shrunk plastics lies between the pipe joints 10 and the insert 18 and so is placed around the field joint before the insert 18 is placed around the sleeve 68. As best appreciated in FIG. 15a, the sleeve 68 has a narrow-waisted hourglass shape by virtue of squeezing tightly around the radially-outer surfaces of the respective parent coatings 14, their chamfered ends 52 and the exposed surfaces of the pipe joints 10 in between.

FIG. 15a shows the insert 18 being assembled from part-tubular sections around the sleeved pipe joints 10. FIG. 15b shows the insert 18 in place, bridging the gap between the truncated parent coatings 14 of the pipe joints 10. Only one of the part-tubular sections of the insert 18 is shown in this view. The insert 18 can be pressed radially inwardly into contact with the sleeve 68 by a pressing member or by external fluid pressure to promote attachment of the insert 18 to the sleeve 68. Once assembled, the part-tubular sections of the insert 18 can be held together and/or to the sleeve 68 by adhesive, by mechanical engagement, by external fastenings such as tensile bands or by fusing, welding or other bonding.

FIG. 15a also shows that it is possible for an insert 18 to be coated or overmolded with a polymer or adhesive layer or skin 70 to promote bonding or adhesion of the insert 18 to the sleeve 68. For example, the insert 18 could be coated with a thermoplastic polymer material that is compatible with a thermoplastic polymer material of the sleeve 68. This allows the insert coating to be fused with the sleeve 68 under radially-inward pressure, with application of heat to the interface to melt or soften the materials. The skin 70 may also improve the water-tightness of the insert 18 by preventing water ingress between the segments 20 and may protect the segments 20 and/or the links 22 from damage during spooling or installation of the pipeline.

An insert coated or overmolded with a polymer or adhesive skin could of course be used in the preceding embodiments that overmolded a field joint coating around the insert. Such a skin could promote bonding or adhesion of the insert to the field joint coating.

FIG. 16 shows a variant of the insert 18 shown in FIGS. 15a and 15b. In this variant, the skin 70 does not fully cover the radially outer face of the insert 18. Instead, the skin 70 extends just to end portions of that outer face, leaving a gap along the central portion of the outer face where there is no skin 70. This reflects that the flexible links 22, if bonded or fused to the segments 20, may alone be sufficient to prevent ingress of water between the segments 20. In that case, the skin 70 is helpful mainly where the insert 18 contacts the sleeve 68, to promote bonding or fusing with the sleeve 68. However, it may also be helpful to overlap the skin 70 a short distance onto the outer face of the insert 18, as shown, to help to protect the insert 18 from damage during spooling or installation of the pipeline.

Turning finally to FIGS. 17 to 24, these show preferred embodiments of the invention that comprise a segmented part-tubular shell 72. A longitudinal series of thin part-annular flat plate-like segments 74 confers a comb-like longitudinal section on the shell 72. The preferred material for the shell 72 is PP because it provides the best trade-off between thermal insulation and mechanical properties. However, in principle, any suitable plastics material could be used, whether thermoplastic or thermoset.

FIGS. 17 and 18 show the shell 72 in isolation. In practice, two such shells 72 will be assembled around a field joint of a pipeline. The shells 72 are rotationally symmetrical about the central longitudinal axis of the pipeline, which axis therefore coincides with a longitudinal axis of curvature of the shells 72.

Each shell 72 has a flexible base comprising a body 76 of tubular curvature and end cups 78 of frusto-conical curvature. The segments 74 are molded integrally with the base and hence suitably of the same material as the base. The series of segments 74 extends along the full length of the body 76 and onto the end cups 78.

Neighbouring segments 74 of the series are spaced from each other longitudinally by gaps 80. As best appreciated in the sectional view of FIG. 18, the body 76 and the end cups 78 of the base bridge the gaps 80 between the segments 74 as a series of flexible webs that link the segments 74 across the gaps 80. In this example, those webs are on the radially inward side of the shell 72.

Whilst the segments 74 of the shell 72 are thin longitudinally, their radially-extending orientation means that in relation to bending of the shell 72 along its length, the segments 74 are very much stiffer than the longitudinally-extending webs that bridge the gaps 80. Also, the radially-extending orientation of the segments 74 confers great compressive strength upon the shell 72 under radially-inward forces that are typically experienced in use as a pipeline is spooled and installed.

When the body 76 is not deflected and hence straight as shown in FIGS. 17 and 18, the segments 74 lie in parallel planes that are orthogonal to the longitudinal axis of curvature of the shell 72, hence extending radially from that longitudinal axis.

Like the embodiment shown in FIG. 2, shells 72 like that shown in FIGS. 17 and 18 could be used around a pipeline field joint without being surrounded or embedded in an insulating field joint coating. Conversely, like the embodiment shown in FIG. 3, shells 72 could be embedded in an over-molded field joint coating that is cast or injected around shells 72 already secured around the field joint. Preferably, however, the shells 72 are provided with insulating infills before being placed around a field joint to make prefabricated insulated inserts like those shown in FIGS. 15a, 15b and 16.

Thus, FIGS. 19 and 20 show insulating infill moldings 82, 84 of a flexible insulating material that are shaped to fill the gaps 80 between segments 74 of a shell 72. In essence, therefore, the infill moldings 82, 84 each comprise a longitudinal series of part-annular flat infill plates 86 that mirror the spacing and depths of the opposed gaps 80 between segments 74 of a shell 72.

The flexible insulating material of the infill moldings 82, 84 can be any suitable plastics material that is softer or more flexible than the material of the shell 72. The infill moldings 82, 84 could, for example, be of the same material as the shell 72 if that material is treated to be softer or more flexible than the material of the shell 72. The infill moldings 82, 84 could be of a different material to the shell 72. For example, if the shell 72 is of PP, the infill moldings 82, 84 could be of PU. It is also possible for a layer of air to be trapped or interposed between the shell 72 and an infill moldings 82, 84.

In principle, the infill moldings 82, 84 could be molded separately from and assembled with a shell 72. Thus, the infill moldings 82, 84 are shown in isolation in FIGS. 19 and 20. In practice, however, the infill moldings 82, 84 are apt to be molded in situ around and between the segments 74 of the shell 72, by placing the shell 72 in a secondary mold for overmolding with the infill material.

Optionally, the infill plates 86 of the infill moldings 82, 84 are molded integrally with a connecting web 88 that is therefore conveniently of the same flexible material as the infill plates 86. In the infill moldings 82 of FIG. 19, the web 88 is relatively thick to provide insulating and protective cover across radially outward extremities of the segments 74 at the radially outward face of the shell 72. In the infill moldings 84 of FIG. 20, the web 88 is relatively thin and simply serves to join the infill plates 86 for moldings and handling.

The result of either in situ moldings or assembly of the infill moldings 82, 84 with the shell 72 looks much the same and is shown in FIGS. 21 and 22 respectively. FIGS. 21 and 22 show inserts 90 that can be placed around a pipeline field joint in a similar manner to the insert 18 shown in FIGS. 15*a*, 15*b* and 16. It will be noted that the infill plates 86 are interleaved or, in section, interdigitated with the segments 74. FIG. 21 shows the thick web 88 of the infill moldings 82 extending across the radially-outward extremities of the segments 74.

The infill plates 86 of the infill moldings 82, 84 are flexible enough to allow the adjacent segments 74 to pivot, splay or converge into non-parallel planes when the base of the shell 72 bends, as the inserts 90 follow bending of a pipeline along its length. The infill plates 86 that fill the gaps 80 may therefore also serve as a series of flexible links between the segments 74, in addition to the flexible webs between the segments 74 defined by the base of the shell 72. Preferably, bonding or fusing between the segments 74 and the infill plates 86 avoids cracks or gaps between the segments 74 and infill plates 86 as the shell 72 flexes in use.

FIGS. 23 and 24 show that a skin 92, like the skin 70 of FIGS. 15*a*, 15*b* and 16, may be applied to the inserts 90 shown in FIGS. 21 and 22. Whilst the skin 92 could cover the inserts 90 fully, the skin 92 is shown here covering the radially outer face of the inserts 90 only partially. Thus, as in FIG. 16, the skin 92 is interrupted by a central gap on the outer face of the inserts 90.

FIG. 25 shows the insert 90 of FIG. 21 placed around a pipeline field joint, and embedded in the field joint coating.

Many other variations are possible within the inventive concept. For example, one or more spacers like those proposed for the insert disclosed in WO 2012/004665 may be provided on the inner face of an insert to space the body of the insert from the pipe joints. This allows a liquid polymer field joint coating 16 to flow between the insert and the pipe joints before curing.

Hinge arrangements between part-tubular sections of an insert could be implemented only at ends of the insert or could be repeated along the length of the insert.

Additives or modifiers may be employed in the insert or the field joint coating, such as an elastomeric modifier like EDPM (ethylene propylene diene monomer rubber) to provide appropriate flexibility and impact resistance, or fibres of glass, aramid or carbon to increase strength and elastic modulus.

Thermoplastics material used for injection-molding the insert or the field joint coating may be PP, polystyrene or any other suitable thermoplastics material that is compatible with the coating applied to the pipe joints. Additives such as fibres may reduce shrinkage and accelerate cooling.

Those skilled in the art will appreciate that combinations of features of the embodiments disclosed above are possible, even if those combinations are not explicitly recited.

The invention claimed is:

1. A rigid pipeline for subsea use, the pipeline comprising an insulating insert positioned around a field joint of the pipeline to insulate the field joint, wherein the insert is embedded in a polymer field joint coating and wherein:

the insert comprises a longitudinal series of annular or part-annular segments of insulating material, curved about a longitudinal axis, that are each joined to one or more adjacent segments of the series by at least one link; and the links are flexible relative to the segments to facilitate bending of the insert along the length of the insert by enabling relative angular displacement between adjacent segments of the series;

wherein each link comprises a part-annular infill plate, made of a more flexible material than the segments, and filling a gap between adjacent segments; and wherein the infill plates are joined together by a flexible connecting web that extends across radially-outward extremities of the segments of the insert.

2. The pipeline of claim 1, wherein the links are of substantially the same thickness as the segments in a radial direction with respect to the longitudinal axis.

3. The pipeline of claim 1, wherein the links are integral with the segments.

4. The pipeline of claim 1, wherein the series of segments comprises:

end segments, one at each end of the series; and two or more body segments between the end segments.

5. The pipeline of claim 4, wherein each end segment has a frusto-conical concave outer side.

6. The pipeline of claim 4, wherein the body segments are hollow discs or part-discs spaced along the length of the insert.

7. The pipeline of claim 1, wherein the segments of the insert are part-annular, and wherein the insert is formed of two or more part-tubular shell sections brought together around the field joint to form a generally tubular insert, each of the part-tubular shell sections comprising one of the longitudinal series of annular segments joined by the at least one link, having the part-annular infill plate, the flexible connecting web extending across radially-outward extremities of each part-tubular shell section.

8. The pipeline of claim 7, wherein the shell sections are pivotably coupled to each other for relative clamshell movement.

9. The pipeline of claim 8, wherein a pivot plate of a first shell section is pivotably engaged with a pivot pin of a second shell section, the pivot pin projecting from at least one segment of the second shell section.

10. The pipeline of claim 1, wherein the insert is coated or overmolded with an adhesive or polymer skin extending along the length of the insert.

11. The pipeline of claim 1, wherein when the pipeline is bent along a length of the pipeline, the insert is bent along a length of the insert and the adjacent segments of the insert are angularly displaced relative to each other about the links between those segments.

* * * * *